(12) United States Patent
Nelson et al.

(10) Patent No.: US 9,162,436 B2
(45) Date of Patent: Oct. 20, 2015

(54) METHOD AND APPARATUS FOR ACCURATE REGISTRATION OF COMPOSITE LAMINATES

(71) Applicant: The Boeing Company, Seal Beach, CA (US)

(72) Inventors: Paul E. Nelson, University Place, WA (US); Mark Boberg, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 179 days.

(21) Appl. No.: 13/734,082

(22) Filed: Jan. 4, 2013

(65) Prior Publication Data

US 2014/0193618 A1    Jul. 10, 2014

(51) Int. Cl.
*B32B 41/00* (2006.01)
*B29C 70/54* (2006.01)
*B29C 70/30* (2006.01)

(52) U.S. Cl.
CPC ............ *B32B 41/00* (2013.01); *B29C 70/30* (2013.01); *B29C 70/543* (2013.01); *Y10T 29/49622* (2015.01); *Y10T 29/49764* (2015.01); *Y10T 29/49771* (2015.01); *Y10T 29/49773* (2015.01); *Y10T 29/49826* (2015.01); *Y10T 29/53039* (2015.01); *Y10T 29/53052* (2015.01); *Y10T 29/53091* (2015.01); *Y10T 428/24802* (2015.01); *Y10T 428/24917* (2015.01)

(58) Field of Classification Search
CPC ...... B32B 41/00; B29C 70/30; B29C 70/543; Y10T 428/24917; Y10T 428/24802; Y10T 29/49771; Y10T 29/49773; Y10T 29/49764; Y10T 29/49826; Y10T 29/49622; Y10T 29/53039; Y10T 29/53052; Y10T 29/35091
USPC ........ 29/407.5, 407.01, 897.2, 705, 702, 703, 29/709, 712, 720, 721; 156/378, 64; 428/195.1
See application file for complete search history.

(56) References Cited

U.S. PATENT DOCUMENTS

| | | |
|---|---|---|
| 5,806,797 A | 9/1998 | Micale |
| 6,496,745 B1 | 12/2002 | Killina |
| 7,068,170 B2 | 6/2006 | Green |
| 7,423,523 B2 * | 9/2008 | Green .......................... 340/436 |
| 2009/0208683 A1 | 8/2009 | Rodman |
| 2010/0196678 A1 * | 8/2010 | Vermeulen ................ 428/195.1 |
| 2012/0074305 A1 | 3/2012 | Scholes et al. |

FOREIGN PATENT DOCUMENTS

| | | |
|---|---|---|
| EP | 1 749 642 A2 | 2/2007 |
| WO | WO 2011/047167 A1 | 4/2011 |

OTHER PUBLICATIONS

International Search Report and Written Opinion mailed Feb. 17, 2014 for PCT/US2013/070594, 11 pages.

* cited by examiner

*Primary Examiner* — John C Hong
(74) *Attorney, Agent, or Firm* — Nexsen Pruet, LLC

(57) ABSTRACT

Methods, systems and apparatuses for dimensionally registering composite laminates are disclosed, wherein readable elements acting as alignment and identification features are incorporated integrally in laminates.

20 Claims, 7 Drawing Sheets

METHOD AND APPARATUS FOR ACCURATE REGISTRATION OF COMPOSITE LAMINATES

TECHNOLOGICAL FIELD

The present disclosure relates generally to the field of laminate production. More specifically, the present disclosure relates to methods and apparatuses for dimensionally registering composite laminates.

BACKGROUND

For the manufacture of composites, it is often required to move layments (uncured laminated charges) through various operations and locations. The layments have features, often on the bottom side, and therefore not visible, requiring precise location or registration to produce the finished product. In known processes, maintaining the registration through the laminate processing is complicated by the lack of stable, locatable features present on the layments.

It is important to maintain positional registration of composite layments, especially when the layment is assembled on a temporary surface other than a cure mandrel. As a result, there are several sources of potential error relative to the incorrect positioning of layments. For example, layment edges are often subject to the tolerance of cutting plies "on the fly". Further, layment edges are subject to distortion due to subsequent forming operations, and layment edges may be covered by subsequent layers or splices. If crenulated edges are formed on the layment (such as, for example, when individual tapes are square cut leaving a saw tooth edge), such edges are poor for subsequent accurate orientation.

Known layment-orienting solutions consist of external markings, such as, for example, those applied with an ink jet device. However, such markings are temporary, imprecise and have poor machine readability. Such markings are often further unreadable under bagging material, and are further inaccessible (not readable) from the opposite side of the layment. Tooling holes have sometimes been used to orient or register metal parts, but this technique is of little use with uncured laminates.

BRIEF SUMMARY

The present disclosure is directed to methods and apparatuses for providing precise, stable features that can be used for predictably positioning layments through a composite manufacturing processing.

The present disclosure contemplates a method for orienting a laminate comprising the steps of providing an uncured laminate material, and providing at least one readable element. The readable element is implanted into the uncured laminate and the laminate is directed to a processing apparatus comprising a readable element detector. The readable element is then detected by the element detector, signals are sent from the detector to a positioning feature in a positioning machine and the laminate is directed precisely to a desired position relative to the readable element. The laminate may be cured before or after positioning the laminate to a desired, precise position.

According to one variation, the readable element is made from a material such as, for example, metal-containing material, organometallic-containing material, radioactive-containing material, and combinations thereof. The readable material is detected by a detector such as, for example, proximity sensors, ultrasonic sensors, thermal imaging sensors, x-ray sensors, eddy current sensors, and combinations thereof.

According to the disclosure, the readable element provides a means for uniquely identifying the laminate. The laminate processing apparatus is preferably a lay-up mandrel, a cure mandrel, inspection apparatus, etc.

According to a further variation, the present disclosure contemplates a method for forming a finished laminate comprising the steps of providing a laminate material to a lamination head, providing a readable element, implanting the readable element into the laminate material, providing a layment forming apparatus comprising a readable element detector, and providing the laminate comprising the readable element to the layment forming apparatus. The readable element is detected by the readable element detector and the laminate is precisely positioned on the layment forming apparatus to form a layment. The layment is removed from the layment forming apparatus and directed to a curing apparatus. The readable element is detected by a readable element detector, and the layment is precisely positioned on the curing apparatus where the curing is effected.

According to the present disclosure, the readable element provides a means for uniquely identifying the laminate. The preferred laminate comprises at least one readable element implanted into the laminate, with the readable element able to be detected by a detector to facilitate precise positioning. The readable element preferably is made from a material such as, for example, metal-containing material, organometallic-containing material, radioactive-containing material, and combinations thereof. The detector preferably comprises proximity sensors, ultrasonic sensors, thermal imaging sensors, x-ray sensors, eddy current sensors, and combinations thereof.

According to a still further variation, the present disclosure relates to an apparatus for orienting and identifying a laminate comprising a means for preparing an uncured laminate material on a mandrel, a means for implanting at least one readable element into the uncured laminate material, a detector for detecting the readable element capable of sending a signal, and a positioning means for directing the laminate comprising the implanted readable element to a preselected location relative to the readable element, with the positioning means capable of receiving a signal.

BRIEF DESCRIPTION OF THE DRAWINGS

Figure 1:
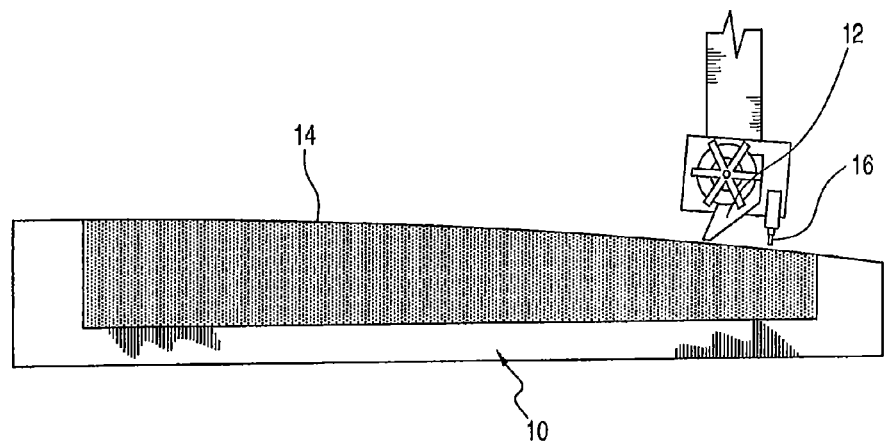
Figure 2:
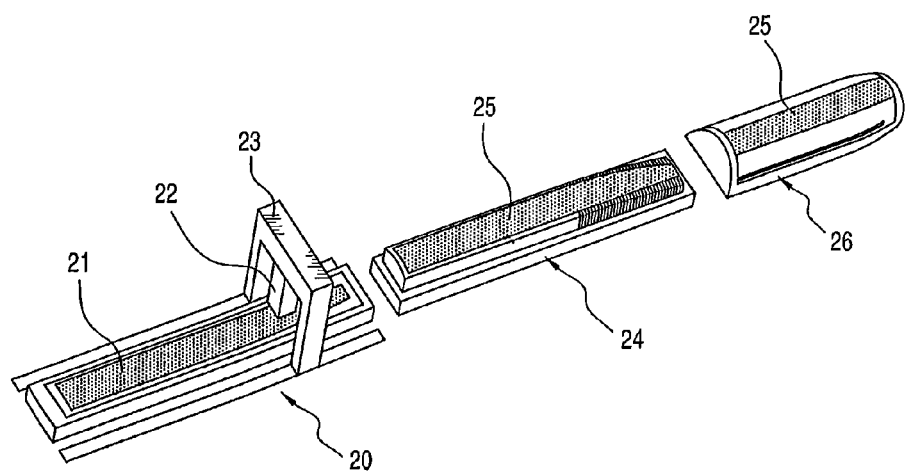
Figure 3:
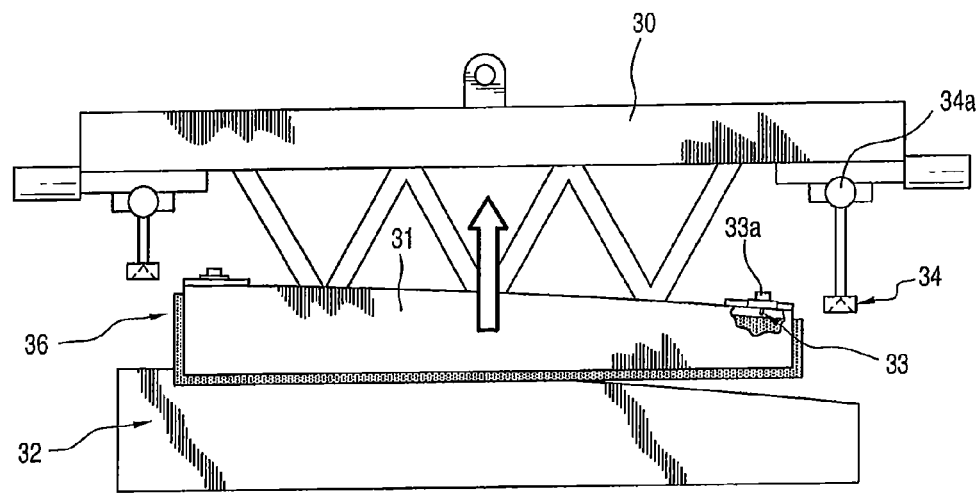
Figure 4:
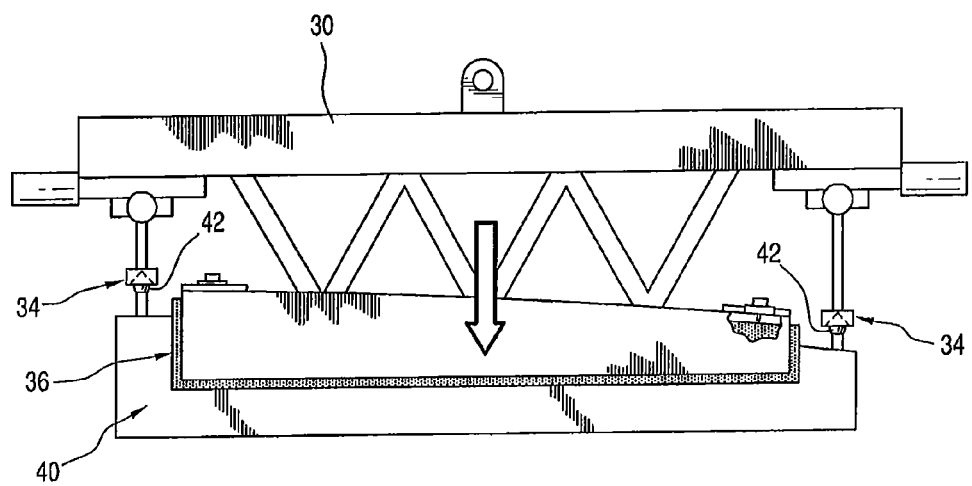
Figure 5A:
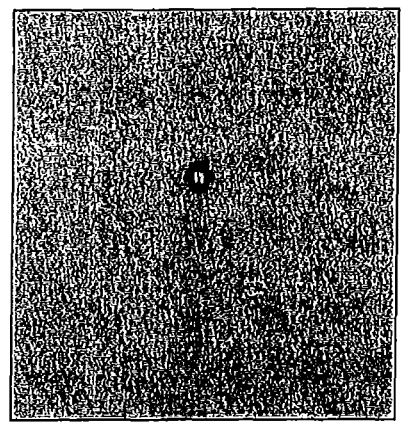
Figure 5B:
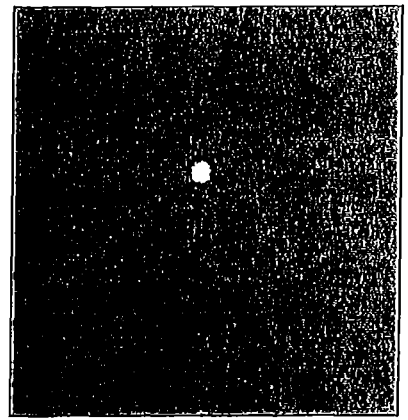
Figure 6:
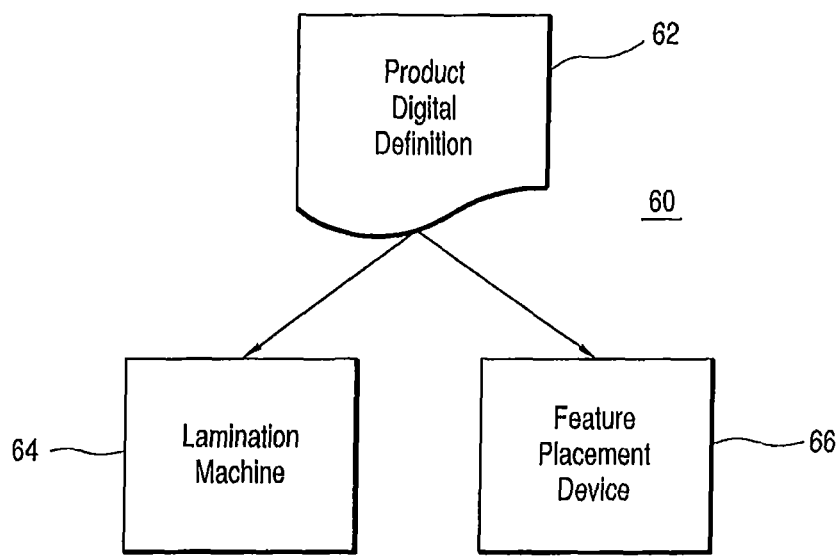
Figure 7:
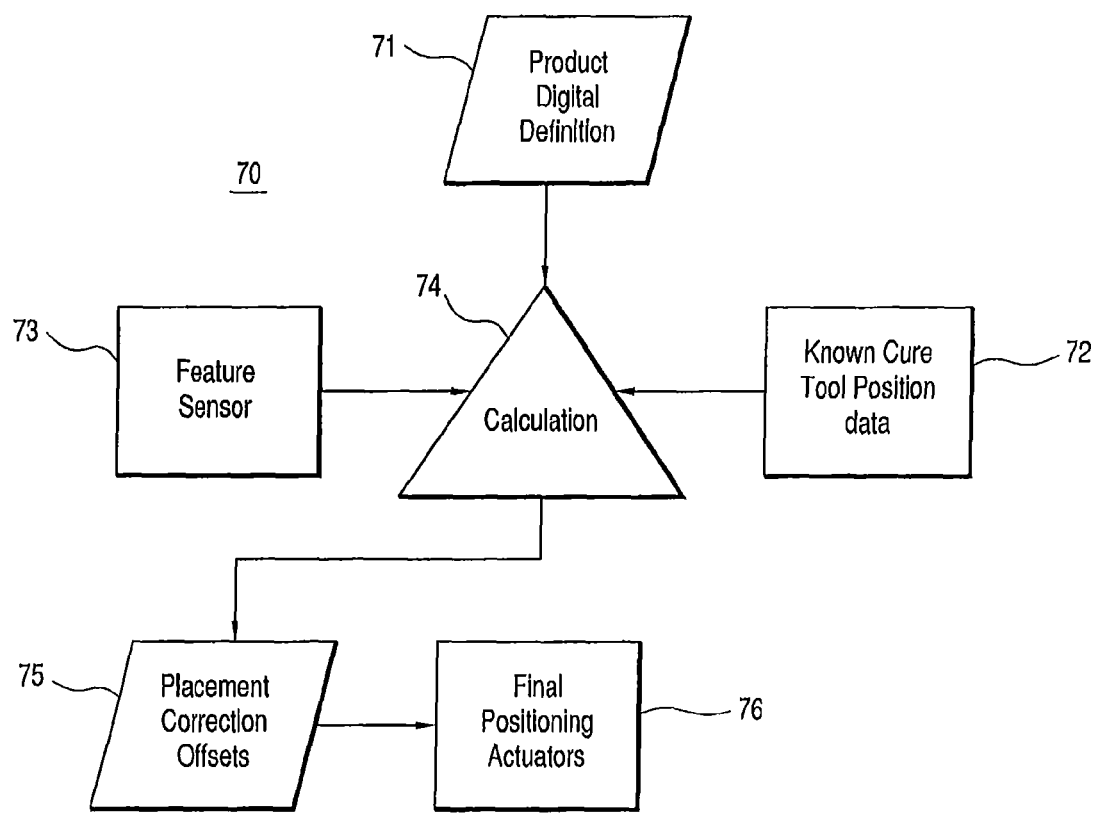
Figure 8:
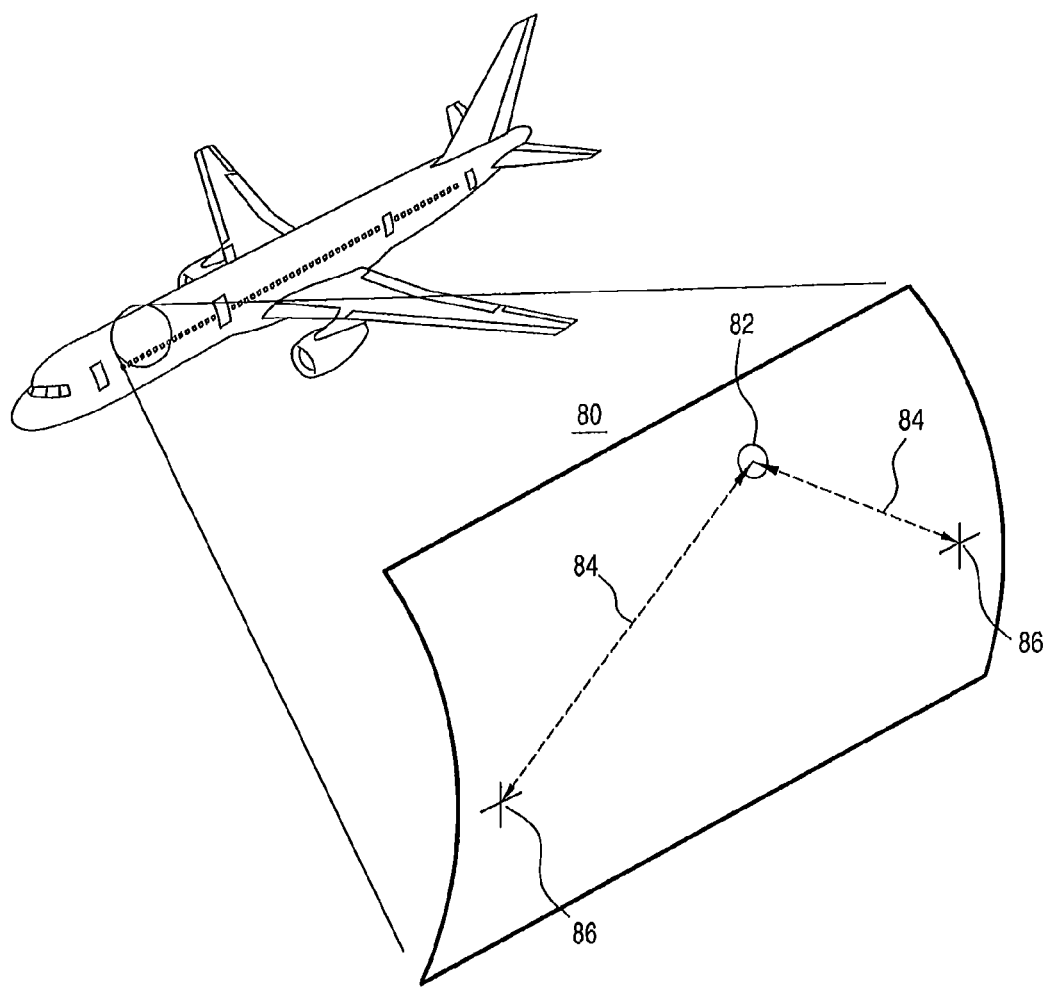
Figure 9:
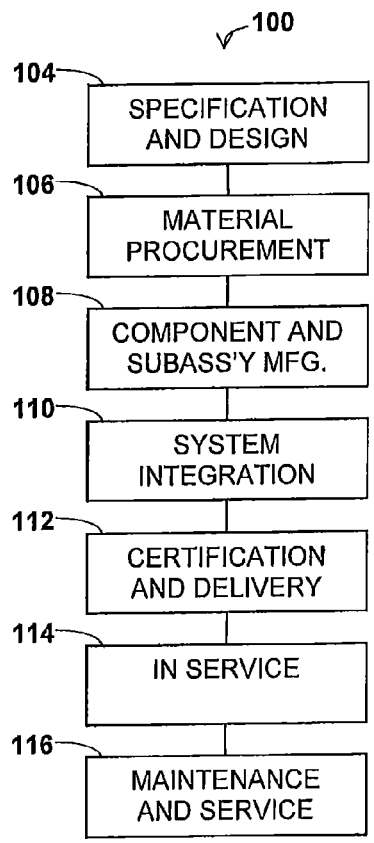
Figure 10:
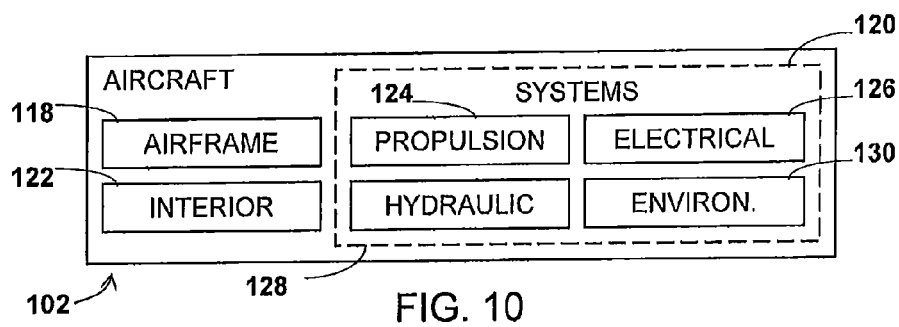

Having thus described variations of the disclosure in general terms, reference will now be made to the accompanying drawings, which are not necessarily drawn to scale, and wherein:

FIG. 1 shows a side view of a lay-up mandrel for forming a laminate;

FIG. 2 shows a perspective view of laminate processing;

FIG. 3 shows a laminate secured in a vacuum chuck;

FIG. 4 shows a laminate moved to a cure mandrel;

FIGS. 5a and 5b show raster scans of a stainless washer readable element implanted into a laminate;

FIG. 6 is a flow diagram outlining a lamination process;

FIG. 7 is a flow diagram outlining laminate alignment features;

FIG. 8 shows a perspective view of a complete airframe with laminate alignment features;

FIG. 9 is a flow diagram of aircraft production and service methodology; and FIG. 10 is a block diagram of an aircraft.

DETAILED DESCRIPTION

FIG. 1 shows a side view of a lay-up mandrel for forming a laminate. According to FIG. 1, a lay-up mandrel 10 is placed in an automated lamination cell and registered to the laydown head 12 as would be understood by one skilled in the lamination field. A prepreg layment 14 is assembled on the lay-up mandrel according to the requirements of the part program. Before the layment 14 is completed, one or more alignment features (readable elements not shown) are accurately placed onto or into the laminate by an alignment feature placement device 16 preferably using adequate pressure to position the readable element alignment features onto or into the prepreg. One or more layers are then added over the readable element alignment features.

FIG. 2 shows a perspective view of laminating processing cell. A lamination cell, as shown, comprises a flat lamination machine 20, a forming machine 24, and a cure mandrel 26. In operation, the flat layment 21 is moved, with a material handling system (not shown) to the forming machine, where the layment becomes a contoured layment 25. The contoured layment 25 is moved to the cure mandrel for curing into a laminated part. The layment must be accurately positioned after each move to obtain the proper configuration of the finished laminated part. Readable element alignment features (not shown) are disposed onto the laminate by a compact accessory module proximate to the lamination head 22 on the lamination gantry 23. A material handling system (not shown) having proximity sensors and closed loop positioning accurately detects the alignment features in the laminate 21 and then places the laminate 21 on forming equipment 24 to form a formed laminate 25. A material handling system (not shown) having proximity sensors and closed loop positioning accurately detects the alignment features in the formed laminate 25 and then places the formed laminate 25 on a cure mandrel 26.

FIG. 3 shows a side view of a material handling system for processing a laminate comprising alignment features (readable elements). A material handling system 30 with a vacuum chuck 31 is placed over a lay-up mandrel 32. The placement of the material handling system has typically not been precise due to extraneously motion from sources such as, for example, crane motion, etc. The vacuum chuck 31 is evacuated, and the material handling system elevates, breaking the layment 36 away from the lay-up mandrel. Vacuum chuck 31 comprises eddy current proximity sensors 33, each mounted on an X-Y digitally-controlled motion guideway 33a perform a raster scan to acquire the position of the alignment features (not shown). Automated data analysis provides the precise location of the layment relative to the material handling system based on the precise location of the detected alignment features. Registration guides 34, mounted on X-Y digitally-controlled motion guideway 34a are driven to appropriate positions relative to the layment 36.

FIG. 4 shows a side view of the laminate processing of FIG. 3 moved to a cure mandrel 40. The material handling system 30 moves the layment 36 to a cure mandrel 40. As the material handling system 30 lowers, the registration guides 34, having been driven by computer control to the proper locations, engage tooling balls 42 on the cure mandrel 40.

According to one variation contemplated by the present disclosure, a typical raster scanning process moves a sensor along a substantially linear path, and then moves an incremental lateral distance to another parallel path. As the sensor detects the boundaries of an element, an image or the element is created. FIGS. 5a and 5b are representative raster scans of a laminate comprising the readable feature of the present disclosure. FIG. 5a shows a raster scan of a stainless steel washer shaped feature dimensioned at about $3/16"\times 1/8"\times 0.002"$ under a single layer of prepreg, with the prepreg thickness commonly being about 0.0076". FIG. 5b shows a $1/8"\times 0.002"$ nickel disk under a single layer of prepreg. Both scans may provide satisfactory results for generating accurate position measurement within at least about 0.030". In ultrasonic inspection, neither feature presents a large enough signature to be regarded as a flaw; with a flaw defined as being greater than about $0.25"\times 0.25"$.

FIG. 6 shows a flow diagram for a lamination process 60, in which a product's digital definition 62 is used to drive the material deposition from a lamination machine 64 and the alignment feature (readable element) placement device 66 responsible for implanting the alignment feature (readable element) into the laminate being fabricated.

FIG. 7 shows a flow diagram for a preferred lamination placement process 70. The desired finished product comprising the laminate has a product digital definition 71. Data from definition 71 along with data from the known tool (cure tool in this example calculation) 72 and the sensed alignment feature (readable element) 73 are fed into calculation means 74. The values from the calculation means 74 are combined with placement correction offset values 75 and together sent to an actuation control mechanism in a final positioning actuator device 76.

FIG. 8 discloses how readable elements provide useful navigational monuments for in-service maintenance of airframes. On a fuselage skin 80, an inspection method, such as an ultrasonic method, either manual or automated, discovers a feature of interest 82. By surveying the distances 84 from the feature to the readable elements 86, the location is now sufficiently mapped for subsequent recovery of the location for further inspection or repair, for example.

Referring more particularly to the drawings, embodiments of the disclosure may be described in the context of an aircraft manufacturing and service method 100 as shown in FIG. 9 and an aircraft 102 as shown in FIG. 10. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The present disclosure is directed to methods for positively and accurately detecting the location of an implanted, readable element in a laminate to enable a detector to send automated signals to a manual, or preferably automated, operation to provide precise and desired positioning of the laminate for further processing, installation, part identification, etc. Further processing contemplates any and all functions such as, for example, adding more layers to the laminate, placement of the laminate on a cure mandrel, locating net trim and holes, dimensional inspection, non-destructive evaluation (NDE) processes (in production and in service), etc.

The readable element is preferably a latent alignment feature implanted into the laminate at various desired and preselected locations as determined and necessitated by the part program. The readable element is preferably a small feature of any desired symmetric or asymmetric geometry, such as, for example, a small disk, square, rectangle, ellipse, arrow, etc., and preferably comprising a metal, such as, for example, stainless steel foil. The readable element can be detected by any suitable detection means, such as, for example, a proximity sensor able to detect eddy currents, but can also be a sensor in connection with ultrasonic sensors, thermal imaging sensors, x-ray sensors, etc., and combinations thereof.

Further, the readable element contributes an insignificant impact to the mechanical properties and non-destructive evaluations (NDEs) of the laminate containing the feature. In addition, the use of such a readable element feature can also provide permanent identification unique to each layment, as well as providing verification of NDE processes such as, for example, providing a known artifact at a known depth. Properly placed and used, the incorporation of the readable features of the present disclosure provides certain, precise and accurate information on the positioning of a part, such as a composite laminate relative to positioning data obtained, thus reducing the presently realized necessary error budget for processes occurring at or downstream from lamination processing stations.

According to one variation, as regards detectability testing, the readable feature implanted in the laminate was a stainless steel shaped feature having a dimension of about 3/16"×1/8", with a thickness of about 0.002" under one layer of prepreg. A raster scan imaging of this implanted readable device is shown in FIGS. 5a and 5b. These images shown in FIGS. 5a and 5b would be satisfactory for generating accurate and precise measurement for layment placement within 0.030" or better. Further, upon ultrasonic part inspection, it is understood that such features would not be large enough (greater than 0.25"×0.25") to be considered as a flaw in the laminate or part or structure comprising the laminate.

Regarding placement of the readable element into or onto a laminate, such a readable element applicator can be retrofitted as an accessory to any lamination equipment as would be readily understood by one skilled in the laminate field. Further, the readable element may be placed manually by use of templates or other placement guides such as, for example, an optical layout template (OLT).

According to a further variation, the digital definition of the part or product drives the lamination processes as well as the placement of the readable element alignment features. During a preferred readable element, or a plurality of readable elements placement process, sensors from a detector locate the readable element(s) to determine the position, as well as the unique identity of the laminate. The data generated are compared to known tool position data to extract laminate placement correction offsets that drive the final positioning actuators. The readable elements can provide identifying information by being positioned in preselected locations to produce a predetermined array. In the simplest case, the measured distance between two readable elements is unique, thereby distinguishing one layment from another. An array of several readable elements can generate large numbers of unique combinations of positions and distances. In addition, still more digital information may be conveyed by giving the readable elements magnetic domains within the element, much like a piece of magnetic recording tape, etc. In a further variation, RFID chips may be used to convey a substantial amount of information, as desired.

Although the preferred variations and alternatives of the present disclosure have predominantly been discussed relative to the manufacture and use of laminates and other parts, the present disclosure is also useful relative to the manufacture and use of such laminates and parts in the fabrication of larger parts and structures. Such devices include, but are not limited to, parts designed to be positioned on the exterior or interior of atmospheric and aerospace vehicles and other objects, and structures designed for use in space or other upper-atmosphere environments, such as, for example maimed or unmanned vehicles and objects. Contemplated objects include, but are not limited to vehicles, such as, for example, aircraft, spacecraft, satellites, rockets, missiles, etc. and therefore include manned and unmanned aircraft, spacecraft, terrestrial, non-terrestrial, and even surface and subsurface water-borne vehicles and objects.

While the preferred variations and alternatives of the present disclosure have been illustrated and described, it will be appreciated that various changes and substitutions can be made regarding the readable element, methods for its implantation in the laminate, and the apparatuses used to effect the implantation, scanning and detection methods therein without departing from the spirit and scope of the disclosure. Accordingly, the scope of the disclosure should only be limited by the accompanying claims and equivalents thereof.

We claim:

1. A method for orienting a laminate comprising the steps of:
   providing an uncured layment;
   providing at least one permanent readable element;
   implanting the permanent readable element into the uncured layment;
   providing a laminate forming apparatus comprising a readable element detector;
   directing the layment comprising the implanted permanent readable element to the laminate forming apparatus;
   forming a laminate comprising the permanent readable element;
   removing the laminate from the laminate forming apparatus and directing the laminate to a curing apparatus;

detecting the permanent readable element in the formed laminate;
predictably positioning the laminate to a desired position at a curing apparatus relative to the permanent readable element; and
curing the laminate;
wherein the laminate is precisely positioned through a composite manufacturing process.

2. The method of claim 1, after the step of curing the laminate, further comprising the step of:
providing precise positioning of the laminate for further processing.

3. The method of claim 1, wherein the permanent readable element is made from a material selected from the group consisting of: metal-containing material, organometallic-containing material, radioactive-containing material, and combinations thereof.

4. The method of claim 1, wherein the permanent readable element is detected by a detector selected from the group consisting of: proximity sensors, ultrasonic sensors, thermal imaging sensors, x-ray sensors, eddy current sensors, and combinations thereof.

5. The method of claim 1, wherein the permanent readable element uniquely identifies the laminate.

6. The method of claim 1, wherein a plurality of permanent readable elements uniquely identifies the laminate.

7. The method of claim 1, wherein the laminate processing apparatus is selected from the group consisting of: a lay-up mandrel, a cure mandrel, and an inspection apparatus.

8. The method of claim 1, wherein the permanent readable element provides precise positioning of the laminate for installation.

9. The method of claim 1, wherein the permanent readable element provides precise positioning of the laminate for part identification.

10. A laminate comprising:
at least one permanent readable element implanted into the laminate, said readable element able to be detected by a detector to facilitate precise positioning of the laminate through a composite manufacturing process.

11. The laminate of claim 10, wherein the permanent readable element is made from a material selected from the group consisting of: metal-containing material, organometallic-containing material, radioactive-containing material, and combinations thereof.

12. The laminate of claim 10, wherein the detector is selected from the group consisting of: proximity sensors, ultrasonic sensors, thermal imaging sensors, x-ray sensors, eddy current sensors, and combinations thereof.

13. The laminate of claim 10, wherein the permanent readable element uniquely identifies the laminate.

14. The laminate of claim 10, wherein a plurality of permanent readable elements uniquely identifies the laminate.

15. A structure comprising the laminate of claim 10.

16. A vehicle comprising the laminate of claim 10.

17. An aircraft comprising the laminate of claim 10.

18. The laminate of claim 10, wherein the permanent readable element provides precise positioning of the laminate for installation.

19. The method of claim 10, wherein the permanent readable element provides precise positioning of the laminate for part identification.

20. An apparatus for orienting and identifying a laminate comprising:
a means for preparing a laminate made from layments;
a means for implanting at least one permanent readable element into the laminate;
a detector for detecting the permanent readable element, said detecting means capable of sending a signal; and
a positioning means for directing the laminate comprising the implanted permanent readable element to a preselected location relative to the permanent readable element,
wherein the laminate is directed by the positioning means for further processing and installation, and wherein the permanent readable element provides precise positioning through a composite manufacturing process.

* * * * *